(12) United States Patent
Kemp

(10) Patent No.: US 6,847,291 B2
(45) Date of Patent: Jan. 25, 2005

(54) APPARATUS FOR DETECTION OF WATER LEVEL AND TEMPERATURE IN A BATHING APPLIANCE

(75) Inventor: William Harry Kemp, Clayton (CA)

(73) Assignee: Sequence Controls Inc., Ontario (CA)

( * ) Notice: Subject to any disclaimer, the term of this patent is extended or adjusted under 35 U.S.C. 154(b) by 80 days.

(21) Appl. No.: 10/011,396

(22) Filed: Dec. 11, 2001

(65) Prior Publication Data

US 2002/0083767 A1 Jul. 4, 2002

Related U.S. Application Data

(60) Provisional application No. 60/255,918, filed on Dec. 18, 2000.

(51) Int. Cl.$^7$ .............................................. G08B 19/00
(52) U.S. Cl. ..................... 340/521; 340/539.3; 340/584; 340/598; 340/612; 340/618; 340/622; 73/290 R; 73/291; 73/292
(58) Field of Search .............................. 340/539.3, 521, 340/584, 592, 593, 594, 598, 604, 612, 618, 622; 4/541.2, 559; 73/290 R, 291, 292, 295, 304 C (56) References Cited

U.S. PATENT DOCUMENTS

| 5,174,153 | A | * | 12/1992 | Nakano | 73/295 |
| 6,568,263 | B1 | * | 5/2003 | Snelling | 73/295 |
| 6,568,264 | B2 | * | 5/2003 | Heger | 73/304 |

* cited by examiner

Primary Examiner—Daryl Pope (57) ABSTRACT

An apparatus operable in a wet environment for detecting the presence or absence of water in a non-conductive vessel, by measuring changes in dielectric constant and detecting the temperature of water in same vessel. A conductive element coupled to a sensing and switching means, transmits data to the controller, resulting from a change of dielectric constant at the conductive element. A temperature sensor detects and transmits temperature signals to the controller. A controller means receives data, from the dielectric constant sensor means and temperature data from the temperature sensor. Includes a coupling means which transmits data from the controller to an external device. The isolation means electrically isolates the conductive element and temperature sensor means from the water contained in a non-conductive vessel.

12 Claims, 5 Drawing Sheets

APPARATUS FOR DETECTION OF WATER LEVEL AND TEMPERATURE IN A BATHING APPLIANCE

RELATED APPLICATIONS

The applicant claims priority of provisional application 60/255,918, filed Dec. 18, 2000.

FIELD OF THE INVENTION

The present invention relates generally to an apparatus used for the detection of water level and temperature in a bathing appliance. More particularly, the present invention relates to a controller coupled to a capacitive water detection means, water temperature detection means and radio transmitter device for the relaying of telemetry data of water level and temperature in a bathing appliance, for use in a wet or electrically hazardous environment.

BACKGROUND OF THE INVENTION

Bathing appliances such as hot tubs, swimming pools, shower units and hydromassage bath fixtures often employ a means of detecting the level of water in the appliance to prevent flooding, operation with insufficient water or damage to plumbing and piping components. Likewise, bathing water temperature measuring probes prevent scalding, freeze protection and promote proper water chemistry.

Prior art water detection and temperature probes are known to be simple devices which require invasive mounting and direct contact with the circulating water. These issues complicate installation, service removal, lower life due to corrosive action with water and potentially create a shock hazard for the bathing user.

Another known system includes the non-invasive, capacitive water detection probe. Such probes eliminate the need for the water detecting elements to be in contact with the water. Such systems employ an apparatus which is capable of detecting changes in dielectric capacitance through a non-metallic vessel. This system measures the dielectric constant of a material. For example, a bath tub which is empty contains relatively dry air, which has a dielectric constant of approximately 2–5. When the bath is filled with water, the dielectric constant changes to approximately 80.

Although these detectors can be fabricated for reasonable cost, they still require fault prone cabling to provide a signal path to a control system. In addition, there is no similar method of measuring water temperature therefore, invasive, in-the-water temperature sensing is considered state of the art. As water level and water temperature detecting are often utilised together, there is little reason to install non invasive capacitance water level sensing with an invasive water temperature sensor.

Accordingly, it is an object of the present invention to provide an improved means of capacitive water level detection and water temperature sensing without an invasive mounting means, such that both water level and water temperature can be sensed through the bathing appliance vessel.

It is a further object of the present invention to eliminate the interconnection cables and associated wiring used in the prior art. The present invention contemplates using an ultra-low power radio transmission signal to provide water level and temperature telemetry data to the controller means.

It is a further object of the present invention to provide a water level and water temperature sensor that is safely operable by a bather immersed in water, creating an electrically safe installation in a wet, electrically hazardous bathing environments.

It is a further object of the present invention to provide a water level and water temperature sensor that utilises very low current consumption from the installed battery, such that battery life is extended to a long a period as possible.

SUMMARY OF THE INVENTION

According to an aspect of the invention, there is provided an apparatus for measuring the level and temperature of water in a non-electrically conductive vessel, comprising:

a sensor plate coupled to a low-frequency oscillator, and logic circuit for measuring change in capacitance;

a temperature sensing device for measuring the temperature of the vessel opposite to the side contacting the bathing water;

a low-power, radio transmitter;

a DC source for supply a direct current power supply to the electronic devices of the present invention;

a controller means for receiving the water level and temperature signals from the electronic logic circuits and for transmitting water level and temperature data to the radio transmitter and for controlling and limiting the electrical energy to the electronic devices described above;

an isolation means for protecting the bather from electric shock.

According to another aspect of the invention, there is further provided a method for measuring the level and temperature of water in a non-electrically conductive vessel, and comprising:

a sensor plate coupled to a low-frequency oscillator, and logic circuit for measuring change in capacitance;

a temperature sensing device for measuring the temperature of the vessel opposite to the side contacting the bathing water;

a low-power, radio transmitter;

a DC source for supply a direct current power supply to the electronic devices of the present invention;

a controller means for receiving the water level and temperature signals from the electronic logic circuits and for transmitting water level and temperature data to the radio transmitter and for controlling and limiting the electrical energy to the electronic devices described above;

an isolation means for protecting the bather from electric shock.

the method comprising the steps of:
 (a) detecting an input signal corresponding to the presence of water;
 (b) detecting water temperature signal
 (c) correcting water temperature signal
 (d) activating radio transmitter
 (e) transmitting corrected water temperature signal
 (f) turn off radio transmitter Other advantages, objects and features of the present invention will be readily apparent to those skilled in the art from a review of the following detailed description of the preferred embodiment in conjunction with the accompanying drawings and claims.

BRIEF DESCRIPTION OF THE DRAWINGS

The embodiments of the invention will now be described with reference to the accompanying drawings, in which.

With respect to the above drawings, similar references are used in different Figures to denote similar components.

DETAILED DESCRIPTION OF THE INVENTION

Figure 1:
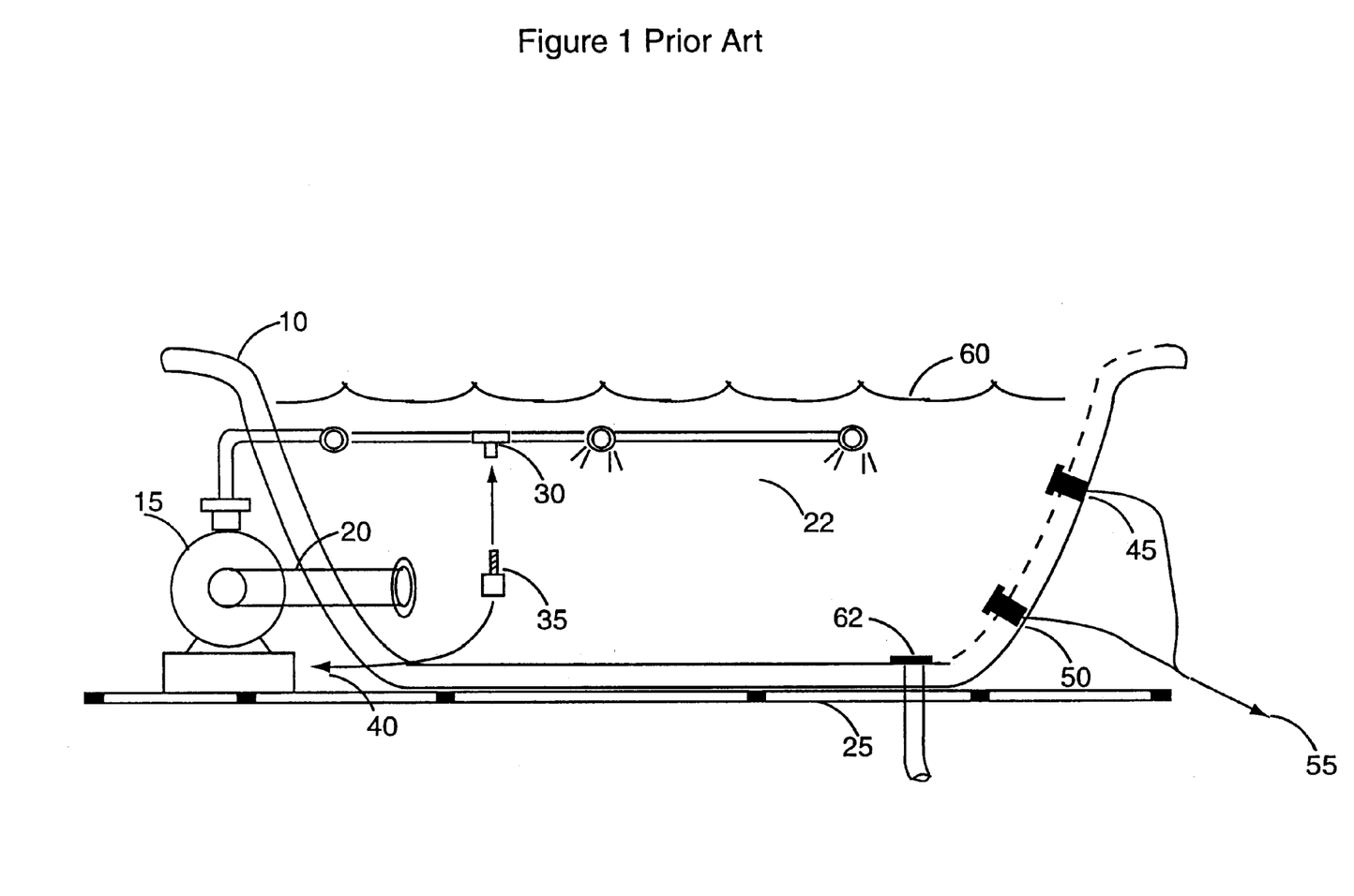
FIG. 1 is a schematic of the prior art showing a cut-away view of a typical hydromassage bathing appliance, detailing the installation of water temperature probe and conductive water level sensing probe.

Referring to FIG. 1, there is shown an embodiment of a prior art water level detector and water temperature sensing devices as installed in a typical hydromassage bathing appliances. A partial section view of the bathing vessel 10 is shown mounted to a floor system 25. Attached to the bath vessel 10 is a hydromassage pump 15, shown with suction piping 20 and water pressure supply pipe 20. To prevent damage to pump 15, it is necessary to ensure that the water level is sufficiently high 60. In this manner, the pump will always receive water at the suction 20 and pressure line 20 will not be uncovered, causing water to spray out of the bathing vessel 10.

Water level sensors 45 and 50 comprise conductive fittings which are installed through a hole in bath vessel 10. The placement of sensors 45 and 50 is such that when the bath is filled to the correct level with water 60, probes 45 and 50 are submerged. A controller means connected to cable 55 places a small electrical voltage on sensor pins 45 and 50, causing a current to flow. The controller means detects this current as a "water present" signal. One advantage of such a sensing system is to prevent the operation of pump 15 when drain 62 is opened. In this example, water will drain out of the tub 62 causing water level 60 to lower. When sensor pin 45 is no longer submerged, the current flow between sensor 45 and 50 is stopped and the controller means connected to cable 55 is signalled that "no water is present". The controller means will then stop pump 15, before pressure lines 22 or suction line 20 is exposed to air, causing damage to pump 15.

Water temperature sensing is achieved by installing sensor element 35 into a fitting 30, which causes bathing water to flow over sensor element 35. The water temperature signal is transmitted to the controller means through interface cable 40.

The prior art embodiment shown in FIG. 1 is typical of many systems which require water level sensing and/or water temperature sensing. The major drawbacks of such systems are corrosion of the sensing elements in the bathing water, invasive installation in the bathing vessel, potential for failure due to interface cables, leaking at the interface between sensor probes and bath vessel and possibility of shock and electrocution hazard due to a voltage failure in the connected controller means entering the bathing water through interface cables.

Figure 2:
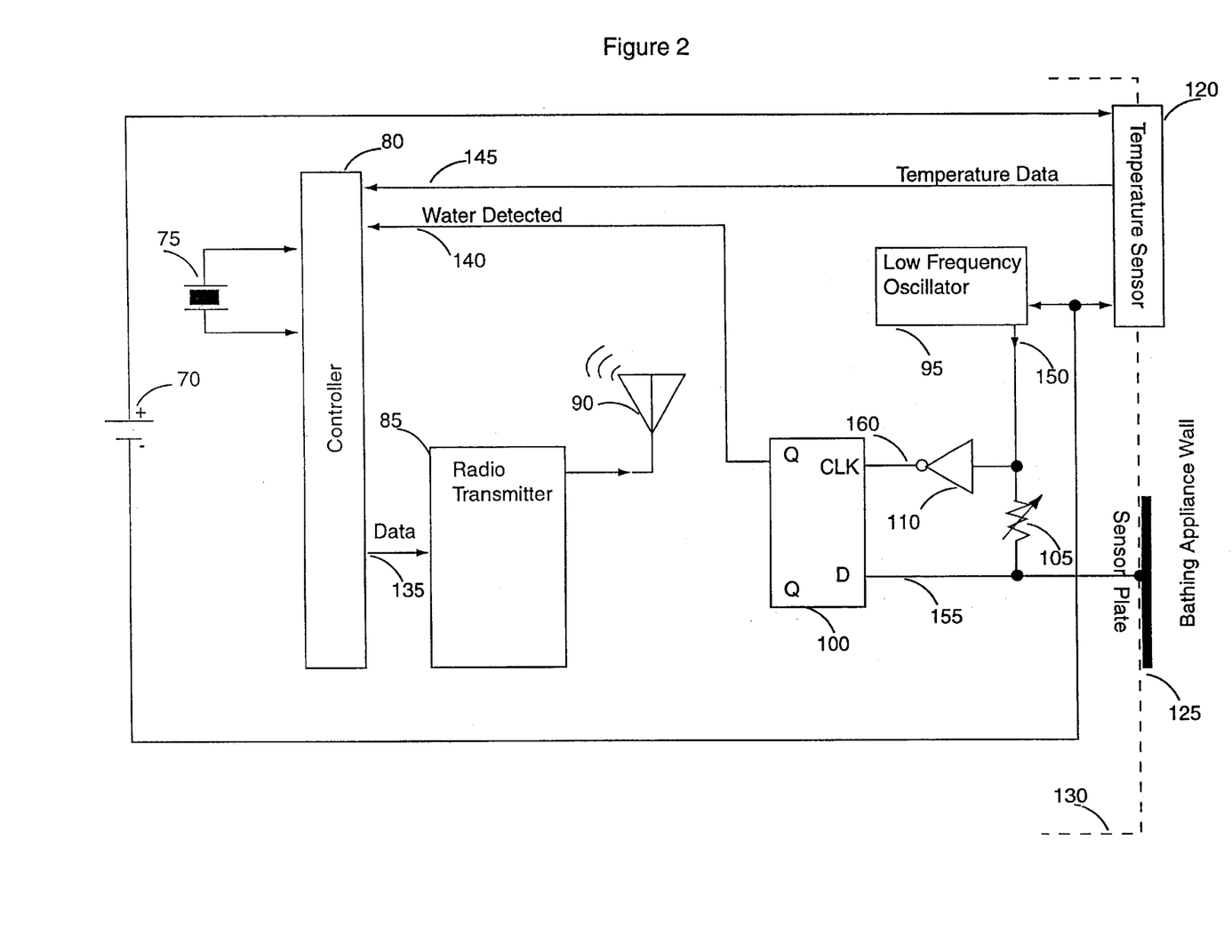
FIG. 2 is a schematic of one embodiment of the present invention.

Referring to FIG. 2, there is shown an embodiment of water level and water temperature sensing system in accordance with the present invention. In this embodiment, a controller 80 is connected to a battery source 70 and a crystal timing device 75. A suitable item for the controller 80 would be the Microchip 12C508 microcontroller, operating with a crystal 75 at a frequency of 32 kHz. Such an arrangement of crystal and microcontroller will provide for the orderly processing of input stimuli received from the water detection circuit signal 140, temperature sensor signal 145 and output control 135 to the radio transmitter 85. Operating microcontroller 80 at a low frequency of 32 kHz allows for low current consumption from direct current power source of battery, 70. The orderly processing of input and output signals completed by execution of the flowchart pattern shown in FIG. 5, current consumption from batteries and crystal controlled operation of a microcontroller such as the PIC12C508 are items a person skilled in the art will have knowledge regarding.

Water temperature is sensed by a detecting means which in the preferred embodiment consists of a semiconductor sensor with serial data communications structure, such as a Dallas Semiconductor thermal sensor. Alternate temperature sensing means could be employed such as a thermistor or thermocouple. A person skilled in the art will have knowledge regarding these temperature sensing means. The temperature sensing device will be placed in close proximity to the side of the bathing vessel opposite that of the water. The method of installation is an important consideration and will be described below. Detecting a temperature on the opposite side of the bathing vessel water will result in a temperature that will be different from the bath water, owing to the thermal resistance of the vessel material. To correct such an "error" in the sensed signal, controller 80 receives temperature data signal 145 and applies it to a correcting algorithm, containing a constant value which has been determined by prior empirical experimentation. Without departing from the scope of the herein invention, it would be possible to devise other means of correcting the error in the temperature data signal 145. Such other means may comprise a calibration routine, learn button or other method a person skilled in the art would utilise.

Controller 80 is provided with an output signal 135 which is coupled to radio transmitter 85. Data output signal 135 presents control and data signals to the transmitter 85. Control signals allow controller 80 to turn radio transmitter 85 on and off, thus preventing a waste of battery power and capacity. Data signals presented to radio transmitter 85 are encoded into a suitable modulation technique and transmitted into space through antenna 90. There are numerous radio transmitter systems, frequencies and techniques that may be employed without departing from the scope of the herein invention. It is further possible for a person skilled in the art to forgo the use of a radio transmitter and rely on a wired communication signal between the herein invention and an external controller means. If such a wired system were to be undertaken, the electrical isolation system necessary for the present invention to be used in a wet, electrically hazardous environment, would result from the inherent insulation of bathing water not being in contact with the electronic circuits used, therein.

Figure 3:
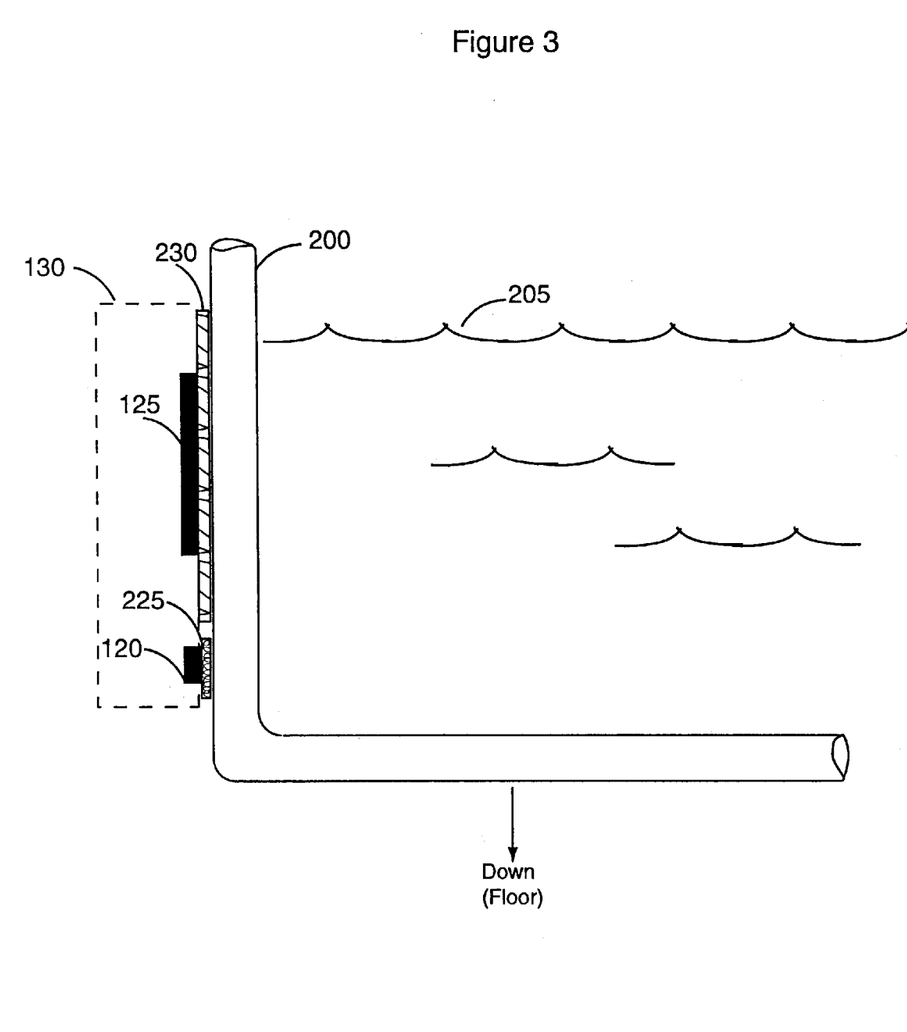
FIG. 3 is a partial cross sectional view detailing one embodiment of the assembly and installation of the present invention.

Continuing to refer to FIG. 2 and also referring FIGS. 3 and 4, a description of the improved capacitive water level sensing system will be given. Water level sensing plate 125 is mounted onto or into the chassis 130 of the probe assembly. The intent is to cause the sensor plate to be mounted on the bathing vessel 200, on the side opposite the bath water 205, such that plate 125 is in as close a proximity to the bath vessel wall 200 as practical. In order to ensure that there is as little air gap between sensor plate 125 and bath vessel 200, a glue or soft spacer material 230 may be used. Additionally, glue 230 may be used as a means of securing the sensor chassis 130 to the bath vessel wall 200. Water level is detected by sensor plate 125, forming a dielectric constant pick-up sensor. The location and mounting of the sensor 125 is reasonably critical as noted above.

The output of a low frequency oscillator 150 is connected to one side of an adjustment potentiometer 105, the "D" input 155 of flip flop 100, the input of a logic inverter 110 and the sensor plate 125. The oscillator frequency is set to as low a frequency as can be utilised with the circuit, in order to limit the current consumption of the oscillator when the probe is not being used, such as when the bathing vessel is empty. A person skilled in the art will be aware that the greater the frequency of such an oscillator, the higher the current consumption from the power supply, which in this embodiment is a battery 70. It would be possible in alternate designs, to utilise a high frequency oscillator and allow the controller means to turn it on and off as desired, to save power. Alternate implementations would be well know to a person skilled in the art and do not depart from the scope of the herein invention. In the preferred embodiment, potentiometer 105 and sensor plate 125 form a resistance/capacitance network which will create a time delay as a result of the product of their respective values. Potentiometer 105 is calibrated such that output signal WATER DETECTED 140 is deactivated when sensor plate 125 is not in the presence of water and that WATER DETECTED signal 140 is activated when sensor plate 125 is in the presence of water. When potentiometer 105 is set to a fixed value, only the capacitance at plate 125 will change, as a result of changes in dielectric constant, altering the timing value of the resitance/capacitance network described above.

When water is not presented to sensor plate 125, the low frequency oscillator signal 150 provides a clocking signal to "D" input 155 of flip flop 100. Simultaneously, the clocking signal 150 is presented to the input of inverter 110, whereupon a propagation delay will present the flip flop clock signal 160 after the "D" input 155 has accepted the new value. The effect of the resistance/capacitance network formed in part by the sensor plate 125 is negligible, due to the low dielectric constant of the bath vessel material and the air contained within the vessel. It should be noted that this form of detection circuit will not work on a bath vessel where the material is conductive or where the vessel walls are unreasonably thick.

When water is presented at the sensor plate 125, additional capacitance is added to the circuit described above, owing to the high dielectric constant of the water. The addition of capacitance at sensor plate 125, in conjunction with the resistance of potentiometer 105 create a time delay circuit. In this manner, the "D" input 155 is now delayed an amount of time equal to the time delay described above, causing the clock signal 160 to arrive in advance. The output "Q" 140 changes state, providing water detected signal to controller 80.

Figure 4:
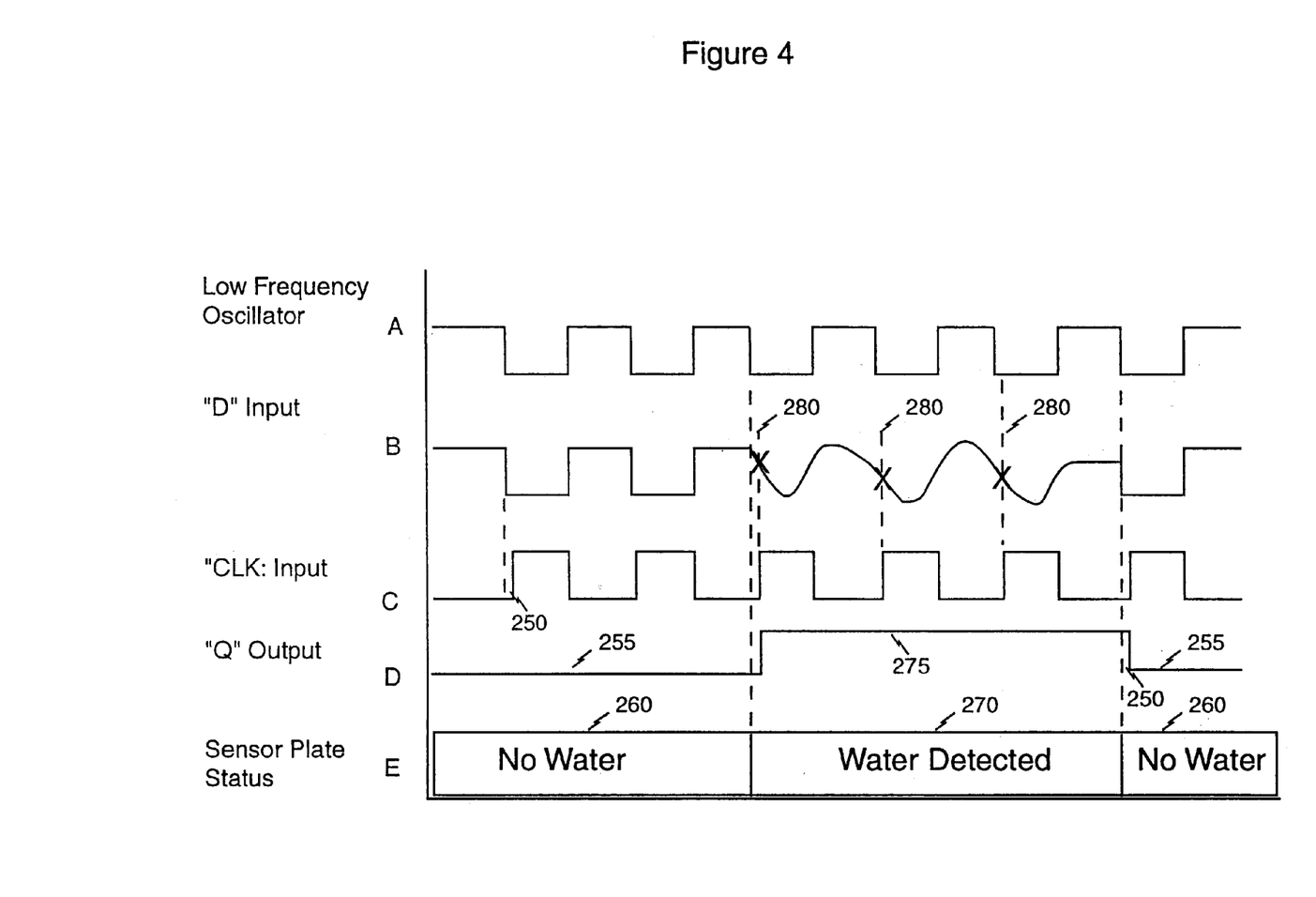
FIG. 4 is a wave form diagram of the voltage signals developed at noted circuit locations of the embodiment of FIG. 2, when water is absent and presented to the detector circuit.

Referring also to FIG. 4, the timing diagrams will assist in the understanding of the above description. The state/timing waveform drawings outlined in FIG. 4 are based on the presence or absence of water at the sensor plate 125 as noted at time locations 260 and 270, respectively. When sensor plate 125 is not subjected to water in its vicinity, the following timing and control sequences are followed. Low frequency oscillator 150 provides clocking pulses which transition from logic high to low, then low to high, forming one complete cycle. This cycling continues at all times when the battery 70 is installed and has sufficient capacity. The frequency of low frequency oscillator is preferably set to as low a value as possible so as to limit the current drain from battery 70. The capacitance of an "empty" bathing vessel 200 as detected at sensor plate 125 is negligible, due to the low dielectric constant of materials and air in the immediate vicinity of the sensor plate 125. Therefore, low frequency oscillator 150 passes through potentiometer 105, without a time delay as a result of the resistance and capacitance function of potentiometer 105 and the negligible capacitance at sensor plate 125. A person skilled in the art will realise that a time delay circuit is created and equal to the product of the resistance and capacitance. As the known resistance of element 105 is multiplied by a negligible capacitance at 125, the result produces a negligible delay. The clocking signal of the low frequency oscillator 150 is presented to the "D" input 155 of flip flop 100.

The clocking signal of the low frequency oscillator 150 is presented to the input of inverter 110 and the inverted and delayed output is presented to the clock input 160 of flip flop 100. The clock input signal 160 is delayed by a small, fixed amount of time equal to the propagation delay inherent in the inverter device 110. This propagation delay of the clock signal 160 in relationship to the "D" input signal 155 is presented on waveform graph 250. The result of these timing mechanisms causes flip flop 100 to select a logic state, such that "Q" output, WATER DETECTED signal 140 is deactivated or low.

The capacitance of a "full" bathing vessel 200 as detected at sensor plate 125 is considerably higher than an empty vessel, due to the higher dielectric constant of the water in the immediate vicinity of sensor plate 125. Low frequency oscillator 150 passes through potentiometer 105, with a time delay as a result of the resistance and capacitance function of potentiometer 105 and the higher capacitance at sensor plate 125. As the known resistance of element 105 is multiplied by a larger capacitance at 125 than in the "empty vessel" example given above, the product produces a larger delay. It is imperative that the resulting time delay be greater than the propagation delay of inverter 110 as will be presently explained. The clocking signal of the low frequency oscillator 150 is also presented directly to the input of inverter 110, without the effect of any time delay. The output signal 160 is inverted 180 electrical degrees, by inverter 110. The output signal 160 forms the clock input 160 of flip flop 100. The clock output signal 160 of inverter 110 is delayed in relation to the low frequency oscillator signal 1150 by a small, fixed amount of time equal to the propagation delay inherent within the inverter device 110. This propagation delay of the clock 160 in relationship to the "D" input signal 155 is presented on waveform graphs 280. The result of these timing mechanisms causes flip flop 100 to select a logic state, such that "Q" output, WATER DETECTED signal 140 is activated or high.

The size of sensor plate 125 determines the amplitude of the capacitance detected when water is in the immediate vicinity. The time delay formed by the product of the sensor plate 125 capacitance and the potentiometer 105 resistance must exceed the propagation delay of inverter 110 for the circuit to operate. It is possible to change the embodiment of the present invention outlined in FIG. 2, by utilising multiple inverters, small or large sensor plates or any other parameter effecting the actual time delay necessary to create waveform patterns similar to those outlined in FIG. 4 without departing from the scope of the invention, which is defined in the claims.

A person skilled in the art will understand the operation of the various logic states and waveform diagrams presented in FIG. 4.

When the water 205 in bathing vessel 200, drops below sensor plate 125, the sensor output signal WATER DETECTED 140 will toggle to a deactivated state. When the water 205 in bathing vessel 200, rises above sensor plate 125, the sensor output signal WATER DETECTED 140 will toggle to an activated state. The toggling of signal WATER DETECTED 140, being an input of controller 80, forms an important element in the execution of the flowchart pattern shown in FIG. 5, which will be presently explained.

Figure 5:
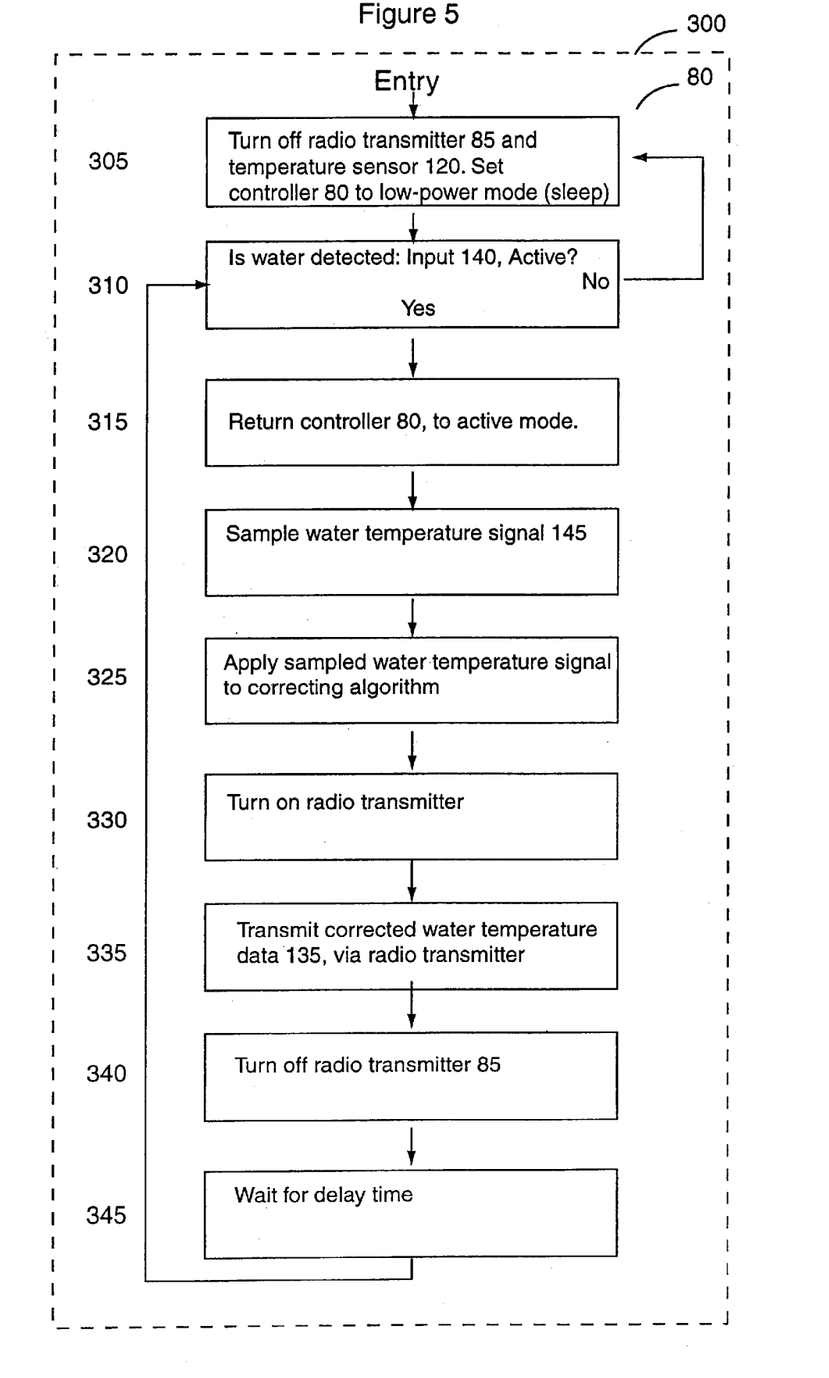
FIG. 5 is a flow chart illustrating the water detection, temperature measuring and radio transmission telemetry sequence of the controller of the present invention.

Referring now to FIG. 5, there is shown a flow chart diagram of the operating mode sequence 300 of controller 80, of the present invention, based on the preferred embodiment schematic shown in FIG. 2. Upon entry to this flow chart, controller 80 will perform step TURN OFF RADIO TRANSMITTER 85 AND TEMPERATURE SENSOR 120. SET CONTROLLER 80 TO LOW-POWER MODE (SLEEP) 305. The controller 80 cannot, in itself advance to step IS WATER DETECTED INPUT 140 ACTIVE? 310. This step of the operating mode sequence is undertaken utilising a method described presently. The controller will advance to step TURN OFF RADIO TRANSMITTER 85 AND TEMPERATURE SENSOR 120. SET CONTROLLER 80 TO LOW-POWER MODE (SLEEP) 305, if the WATER DETECTED 140 input is deactivated.

The controller will advance to step RETURN CONTROLLER 80 TO ACTIVE MODE 315, if the WATER DETECTED 140 input is activated. A reader skilled in the art will understand that causing controller 80 to alternate between a low-power mode (sleep) and an active mode, will cause a resulting drop in current consumption from battery 70, thus increasing battery life and operating time. It is further known that when a controller 80, such as the preferred device presented above, the Microchip PIC12C508, is in a low-power or sleep mode, no systematic processing of signals can be undertaken. This apparent anomaly, is explained by a special function of the Microchip PIC12C508, wherein a toggling of an input from one logic state to another will cause the controller to return to an active state where systematic processing of signals can be undertaken. In the present invention, the WATER DETECTED 140 input continues to monitor the water level 205 in bathing vessel 200, by detecting changes in dielectric constant at sensor plate 125 and the coupled logic circuits, components and continuously operating low frequency oscillator 150, described above.

Controller 80 will then advance to step SAMPLE WATER TEMPERATURE SIGNAL, 145 320. This step causes temperature sensor probe 120 to output TEMPERATURE DATA signal 145 to controller 80.

Controller 80 will then advance to step APPLY SAMPLED WATER TEMPERATURE SIGNAL TO CORRECTING ALGORITHM 325. The temperature signal 145 which is output from temperature sensor 120 is located on the bathing vessel 200 wall, on the side opposite the water in the vessel 205. The temperature signal 145 will provide a temperature signal which is not equal to the actual temperature of water 205 contained in the bathing vessel. As described above, the correcting algorithm will correct for this temperature error factor.

Controller 80 will then advance to step TURN ON RADIO TRANSMITTER 85, 330. Radio transmitter 85 is turned on (or off) under operation of controller 80 to further reduce current consumption of battery 70.

Controller 80 will then advance to step TRANSMIT CORRECTED WATER TEMPERATURE DATA 135, VIA RADIO TRANSMITTER. 335. Readers skilled in the art will understand that sending water temperature data requires some form of data encoding which may be selected from may designs. The longer the data format and the slower the transmission method, the greater the time radio transmitter 85 is active and the larger the current drain on battery 70. There is no need to transmit that water is detected at probe 125 because water temperature data 145 is transmitted only when WATER DETECTED 140 signal is active Controller 80 will then advance to step TURN OFF RADIO TRANSMITTER 85, 340. Controller 80 will then advance to step WAIT FOR DELAY TIME 345. This step introduces a delay in the execution of operating mode sequence 300 of controller 80. This delay recognises that continuous transmitting of water temperature data 140 is unnecessary due to the thermal hysteresis of the bathing vessel 200, causing slow changes in temperature registered at temperature sensor probe 120. It further reduces the current consumption from battery 70 by reducing the time radio transmitter 85 is active.

Controller 80 will then loop to step 310 where operating mode sequence 300 of controller 80 is repeated.

A reader skilled in the art will understand that there are numerous disclosures and descriptions referring to unique means of operating the present invention on a very low-power battery. One preferred battery is a 3 Volt lithium cell with a capacity of 1,000 mAh. The very low-power consumption and current control means described provides for satisfactory battery life and allows the present invention to be installed in a wet, electrically hazardous environment without creating a shock hazard to a user immersed in the bathing water.

Numerous modifications, variations and adaptations may be made to the particular embodiments of the invention described above without departing from the scope of the invention, which is defined in the claims.

What is claimed is:

1. An apparatus operable in a wet environment for detecting the presence or absence of water in a non-conductive vessel, by measuring changes in dielectric constant and detecting the temperature of water in same vessel, the apparatus comprising:
   a conductive element coupled to a sensing and switching means, causing a switch between a first state and second state resulting from a change of dielectric constant at the conductive element; and
   a temperature sensor means, for detecting and transmitting temperature signals; and
   a controller means for receiving data, such data being a first and second state from dielectric constant sensor means and temperature data from temperature sensor; and
   a coupling means, for transmitting controller data to an external device; and
   an isolation means for electrically isolating the conductive element and temperature sensor means from the water contained in a non-conductive vessel.

2. An apparatus as defined in claim 1, wherein the conductive element is the copper plating comprising a printed circuit board.

3. An apparatus as defined in claim 1, wherein the sensing and switching means includes a logic gate arrangement.

4. An apparatus as defined in claim 1, wherein the sensing and switching means includes a flip flop logic gate, low frequency oscillator, inverter logic gate, and potentiometer.

5. An apparatus as defined in claim 1, wherein the temperature sensor means is a thermistor.

6. An apparatus as defined in claim 1, wherein the temperature sensor means is a digital temperature transmitter.

7. An apparatus as defined in claim 1, wherein the controller means is microcontroller.

8. An apparatus as defined in claim 1, wherein the coupling means is an interface cable assembly.

9. An apparatus as defined in claim 1, wherein the coupling means is a radio transmitter arrangement.

10. An apparatus as defined in claim 1, wherein the coupling means includes a light emitting diode transmitter arrangement.

11. An apparatus as defined in claim 1, wherein the isolation means comprises a battery and radio transmitter.

12. A method for a sensor operable in a wet environment for detecting the presence or absence of water in a non-conductive vessel, by measuring changes in dielectric constant and detecting the temperature of water in same vessel, the apparatus comprising:

a conductive element coupled to a sensing and switching means, causing a switch between a first state and second state resulting from a change of dielectric constant at the conductive element; and     a temperature sensor means, for detecting and transmitting temperature signals; and     a controller means for receiving data, such data being a first and second state from dielectric constant sensor means and temperature data from temperature sensor; and     a coupling means, for transmitting controller data to an external device; and     an isolation means for electrically isolating the conductive element and temperature sensor means from the water contained in a non-conductive vessel;

the method comprising the steps of:

(a) turn off radio transmitter, temperature sensor, set controller to low-power mode;

(b) wait for water detection signal;

(c) set controller to active (normal) operating mode;

(d) sample water temperature signal;

(e) correct sampled water temperature signal;

(f) turn on radio transmitter;

(g) transmit corrected water temperature signal, via radio transmitter (h) turn off radio transmitter;

(i) wait for time delay.

* * * * *